July 28, 1942.  J. A. HEANY  2,290,878
ABRADING MATERIAL AND PROCESS OF MAKING SAME
Filed Sept. 24, 1938
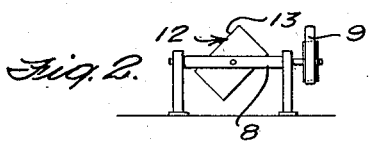
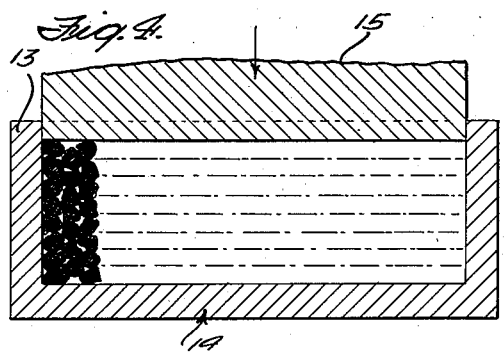
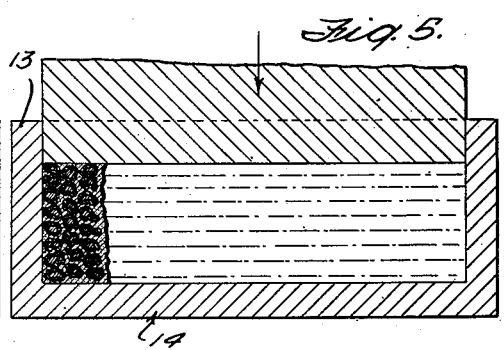
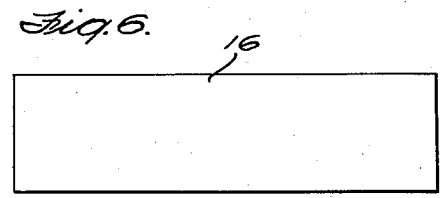
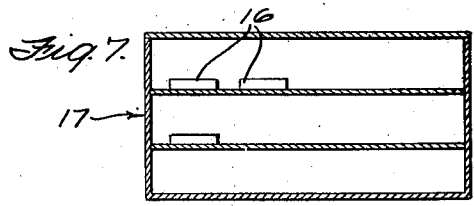
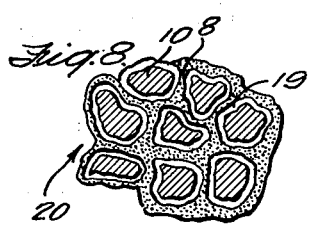
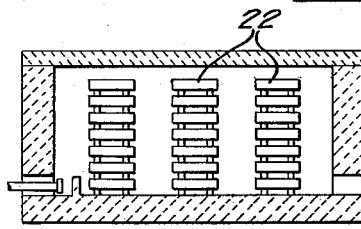
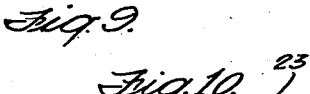
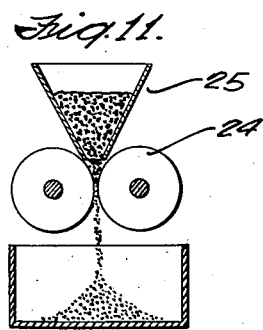
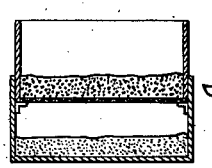
INVENTOR
JOHN ALLEN HEANY
BY
Braselton Whiteout & Davies
ATTORNEY Patented July 28, 1942

2,290,878

UNITED STATES PATENT OFFICE 2,290,878

ABRADING MATERIAL AND PROCESS OF MAKING SAME

John Allen Heany, New Haven, Conn., assignor to Heany Industrial Ceramic Corporation, Rochester, N. Y., a corporation of New York Application September 24, 1938, Serial No. 231,592

11 Claims. (Cl. 51—309)

This invention relates to abrasive material suitable for use in grinding and abrading operations.

According to present practice it is customary to employ a crystalline abrasive material bonded together so as to form a grinding wheel or a flat surface adapted to be applied to the material which is being subjected to treatment. This crystalline substance is in the form of small particles or grains of hard substances of the type of alumina or various carbides such as silicon carbide. The bond may be of a variety of substances such as clay or mixtures of clays, rubber, synthetic resins and the like which are not so hard as the crystalline abrasive grains, and hence in the grinding operation yield before the crystalline substances, thus insuring continuously a rough grinding surface free from glaze. The crystalline abrasive also wears down by fracture along the crystalline surfaces, thus continuously presenting new cutting edges to the ground surface.

A disadvantage of the usual structures hereinabove described lies in the fact that due to the weakness of the bond the abrasive grains are frequently removed from the grinding surface when only a small part of the grain material has been utilized, the grain being thrown out bodily in the grinding operation. This results in rapid wear and increases the grinding cost proportionately.

It is an object of the present invention to provide an abrasive material which utilizes crystalline grains with a second primary abrasive which also serves as a bond of such tenacity and hardness as to prevent rapid deterioration of the grinding surface of the abrasive unit. It is another object of the invention to provide an abrasive material which is strongly resistant to high temperatures. A further object is to provide an abrading substance formed of grains which are unyieldingly fixed in position relative to the abrading mass. An object of the invention also is to provide a process for combining formed crystals with binding abrasive substances having a pronounced shrinkage when subjected to heat. A further object is to provide an abrasive unit in which the average hardness, including the abrasive grains and bond, is 9 Mohs or greater.

Other objects of the invention, including those relating to economy of cost and simplicity of methods of manufacture, will appear on consideration of the following description of the invention applied to illustrative examples, taken in conjunction with the accompanying drawing, in which:

Fig. 1 is a sectional view of an abrasive grain, greatly enlarged, coated with a volatilizable substance;

Fig. 2 is a diagrammatic view of a mixer;

Fig. 3 is a sectional view of an abrasive grain coated with volatile and bonding substances;

Fig. 4 is a sectional view of a press before compression;

Fig. 5 is a view of the press after compression;

Fig. 6 is a view of the intermediate article;

Fig. 7 is a diagrammatic view of an oven for heating the articles;

Fig. 8 is a sectional view of the articles treated by the oven of Fig. 7.

Fig. 9 is a sectional view of the high temperature furnace with the articles stacked for heating;

Fig. 10 shows diagrammatically in section a rough crusher for the articles;

Fig. 11 shows a fine or roll crusher;

Fig. 12 is a sectional view of grading apparatus; and

Fig. 13 is a sectional view of the completed abrading substance.

For purposes of illustration my invention will be described chiefly in connection with the use of crystalline substances as one of the abrasive elements, although noncrystalline grains may be employed. Crystalline grains of aluminum oxide or silicon carbide which have a hardness approaching 9 Mohs have been found to be satisfactory for the abrading units employed in my invention. These grains being crystalline, in the abrading action fracture along the crystalline planes, thus constantly presenting new cutting surfaces to the material being treated.

Instead of the usual weak bond employed such as rubber or synthetic resins I utilize an aluminous composition such as alumina or bauxite in a vitreous, amorphous state wherein it has a very high degree of hardness and tenacity. Ordinarily this material is weak, soft and unusable as a bond, but when prepared in accordance with the disclosure of my co-pending applications Serial No. 131,126, filed March 16, 1937, and Serial No. 135,369, filed April 7, 1937, these substances become extremely hard and tenacious, and hence usable as an abrasive material. According to these applications Serial Nos. 131,126 and 135,369, the aluminous material, such as dehydrated bauxite or dehydrated precipitated aluminum hydroxide, which has been dehydrated preferably at or below a red heat, is ground to substantially less than 50 microns, preferably by a wet grinding procedure in a ball mill or pebble mill with water to a fineness preferably averaging between 12 and 20 microns. The water is then removed as by filter pressing, the filter cakes dried, and the resultant dried filter cakes ground, the ground material being shaped or formed. Such material is capable of being vitrified at temperatures varying from 1000° C. to 1600° C. without fusion of the alumina. As stated, the material is amorphous, that is, it is properly characterized as substantially free of crystalline structure, the fracture being conchoidal.

An apparent objection to the use of aluminous material resides in the fact that the shrinkage factor is high, approaching 30% for bauxite and 23% for alumina. If the bauxite, for example, made in accordance with my applications hereinabove referred to, is mixed with the crystalline abrasive grains and heat treated the result will be a useless article, inasmuch as the shrinkage of the crystalline grains is zero, and consequently the resistance of the grains to the shrinkage of the bauxite prevents the normal cohesive action of the bauxite to take place, the result being a weak, porous and unsatisfactory article.

I have discovered, however, that the difficulty arising from the difference in the shrinkage factor of the grains and the bond may be overcome by coating the grains, prior to mixing with the aluminous material, with a volatile substance which is subsequently removed prior to the vitrification of the aluminous material.

Another disadvantage in the use of aluminous material made in accordance with my applications above referred to lies in the vitreous nature of the product. If a solid mass is applied to a surface to be abraded the abraded material coats the abrading substance to produce a glaze. By mixing the crystalline grains with the vitreous material, however, the viterous surface is broken up to give the effect of multiple radially projecting walls, each of which serves as a cutting or abrading edge with sufficient friableness to wear down with use without glazing. An edge having a thickness between 0.003 inch and 0.005 inch does not glaze, and I may use wall thicknesses varying between 0.010 inch and 0.001 inch.

Describing the formation of my abrasive in connection with the bauxite as an example, the crystalline grains are first placed in a container to which an oil, preferably of the non-drying type such as castor oil, is added in sufficient quantity to coat the surfaces of the grains and impart a somewhat adhesive film to the surfaces thereof.

To the oiled grain is added a volatile substance in powdered form. I prefer to use naphthalene as it sublimes and has a relatively low melting point. The naphthalene is powdered to approximately an air-flow fineness and placed with the oil-coated grains in an agitator or mixing chamber with a plurality of steel balls to aid in the agitation and to insure a uniform coating of the grains by the naphthalene powder. The naphthalene constitutes usually 1% to 2% of the grain mass.

After the mixing operation in which the grains are coated with the naphthalene, as shown for example in Fig. 1, wherein the grain 10 is shown coated with a naphthalene layer 11, I place the grains together with powdered bauxite, prepared in accordance with the processes stated in my co-pending applications hereinabove referred to, in a mixer 12 of the type shown in Fig. 2 in which the chamber 13 is angularly positioned on the shaft 8 and rotated by the power means 9. This mixing operation is continued for a short time interval until the bauxite powder, which has a fineness preferably under 20 microns, uniformly coats the naphthalene-coated grains to produce a composite grain as shown in Fig. 3, in which 10 is the crystalline grain, 11 is the naphthalene layer, and 12 the bauxite layer. These dual coated grains are now placed in the receptacle 13 of the press 14, as shown in Fig. 4, where they are compressed by a plunger 15. As shown in Fig. 5, the compression results in elimination of the various inter-grain spaces and production of a solid article conforming in shape to that of the press mold, as shown at 16 in Fig. 6.

The intermediate article 16 is now ready for treatment to remove the volatile substance, naphthalene in the example given. The various articles which are still more or less soft but sufficiently cohesive for handling, are placed in the chambers of the oven 17 diagrammatically shown in Fig. 7, where they are subjected to a temperature not exceeding 75° C. where naphthalene is used, for a time period dependent upon the size of the article. For small articles two and one-half days are required to remove completely the volatile naphthalene. Temperatures in excess of 75° C. are avoided in the case of naphthalene since the melting point of this substance is 80° C., and if liquid forms about the naphthalene it tends to seal the walls enclosing the various grains, and these walls subsequently are disrupted by the gas formed by continued volatilization of the naphthalene.

After the oven heat is completed the articles are free of the volatile substance and consist only of grains enclosed loosely in cavities formed by the bauxite, as indicated in section in Fig. 8, showing the grains 10, the bauxite material 18 and the grain cavities 19, thus forming the intermediate article 20.

The article 20, together with similar articles, is now placed in the sintering furnace 21, preferably in stacks, and is there fired, the temperature varying with the aluminous material used— for bauxite ranging from 1200° C. to 1450° C. and for alumina from 1200° C. to 1600° C., in no case, however, exceeding the melting point of the aluminous substance. The time of firing, of course, depends upon the size of the articles and furnace, and the nature of the aluminous substance employed. For a small size cake or article with bauxite as the aluminous material nine hours heat is necessary; and for larger articles, one to two weeks is required.

As a result of the firing of the intermediate article 20 the bauxite shrinks normally to take up the spaces previously occupied by the grains, so that in the final article 22 the grains are rigidly and firmly bonded in the cellular bauxite mass. The vitrified bauxite is highly tenacious and of a hardness approximating 9 Mohs or over, and in combination with the crystalline alumina or carbide forms an extremely durable and compact abrasive mass having an unusually high average hardness.

The fired article 22 may be used at once for abrasive purposes provided the proper shape mold was employed in the press, for example, abrasive wheels. Inasmuch, however, as the fired article is of high density and relatively low porosity, and since dependence must be put almost entirely upon the breaking away of the crystalline structure to prevent glazing, it is usually desirable to granulate the fired mass and re-form the material with a weaker bond.

Accordingly, the fired article is passed through a rough crusher, as for example the jaw crusher shown at 23 in Fig. 10, wherein the various articles are roughly broken, and subsequently passed between the rollers 24 of the fine grinder 25 of Fig. 11, the material being thus brought into granular shape. These grains are then graded as indicated in Fig. 12. There is thus produced a composite abrasive grain 26 of the type indicated in Fig. 13, in which the crystalline grains 27 are bonded together by means of the hard, dense, tenacious and vitreous bauxite 28. These composite grains may then be applied to a flat abrasive surface or molded with the usual ceramic or similar bond such as rubber, synthetic resin, shellac, silicate of soda, or clays containing fluxes, to form an abrasive wheel or any other desired shape of grinding apparatus.

In the operation of an abrasive unit formed of the fired article 22 or of the composite grains 26 the abrading develops from the action of two elements, namely: the crystalline grains 27 and the vitreous bauxite 28, both of these elements having a hardness around 9 Mohs. Since the bauxite is in the form of thin walls between the crystalline grains, the effective area of the bauxite contacting the surface of the material being treated will always be small, and hence these walls will tend to disintegrate with use, presenting new abrading surfaces to the material. In effect, therefore, the bauxite is similar to an instrument having a plurality of cutting edges. Also, the grains intermediate these thin walls being of a crystalline nature, break away in use along the crystalline planes, thus presenting new cutting and abrading surfaces. There is thus a dual abrasive action in the abrasive grains 27 which is highly effective in action to cut away and disintegrate the material being treated. In addition, the structure of the abrasive unit, because of the high tenacity and strength of the bauxite bond, has considerable ruggedness and resistance toward breakage through compression. Further, in the case of the composite grains 26 the tendency of the grains to break away from the bonded mass of abrasive is greatly reduced because of the relative largeness of the composite grain and the corresponding increase and depth and tenacity of relationship resulting from such enlarged size.

Mention has been made of the use of various substances such as bauxite and alumina or other aluminous material as constituting the non-crystalline or non-recrystallized bond. It is, of course, apparent that other materials could also be used provided the substituted bond had the requisite degree of strength and hardness and could be fixed into the mass without the use of unduly high temperatures. Similarly, volatile substances other than naphthalene could also be used including anthracene, camphor and phthalic anhydride, the chief requirement being that the substance sublimes below its melting point. Of course, other volatile substances may also be employed provided their use does not bring about a disruption or disintegration of the cellular structure.

Alumina and silicon carbide have been mentioned as the grain substance. However, any hard abrasive may be used or materials of lesser hardness such as silica. The process specifies the use of a crystalline substance such as alumina as forming the basis of the abrasive grains. However, non-crystalline substances may be employed in certain cases, depending upon the use of the completed material. Also, the process may be applied to non-abrasive substances.

The present application is particularly directed to the embodying of crystalline abrasive grains, such as those of alumina and silica carbide, in an amorphous vitreous material having a hardness approaching or equal to, or even greater than, the hardness of the grains so that both the grains and the binder material will serve for the grinding or abrading purposes.

In my co-pending application Serial No. 229,283, filed September 10, 1938, there is disclosed another procedure according to which the finely and colloidally ground dehydrated alumina or bauxite or other aluminous material is mixed with particles of volatilizable material, such as naphthalene, which upon being removed from the body of the amorphous material will leave openings or cells giving, upon firing and vitrification, a cellular ceramic which will always present sharp edges during the grinding operation, due to the cell conformation.

In my co-pending application Serial No. 231,591, filed September 24, 1938, there is disclosed and claimed a combination of the cellular structure and the grain abrasive structure of the present application, with the hard abrasive grains embodied in the vitrified aluminous material, the cells being formed by removing the volatilizable material before vitrification.

In my co-pending application Serial No. 225,376, filed August 17, 1938, there is reference to an article of manufacture, for example, a cellular mass of vitrified alumina derived from colloidally ground dehydrated bauxite or alumina.

In my co-pending application Serial No. 256,664, filed February 16, 1939, there is a more detailed description of the method of forming alumina or bauxite in dehydrated and colloidally ground condition and of converting the ground alumina into a cellular structure in combination with naphthalene and other volatilizable materials.

Various modifications other than those hereinabove shown and described may be made such as come within the scope of the claims hereto appended.

What I claim is:

1. A process for making abrading material which comprises coating abrasive grains with a volatilizable substance to form a first intermediate grain, coating said grain with powdered, colloidally ground, readily vitrifiable aluminous material to form a second intermediate grain, compressing said second intermediate grains to form a preliminary article, heating said preliminary article at a temperature below the melting point of the volatilizable substance to remove said substance, and finally heating the preliminary article to a temperature below the melting point of the aluminous material to bring about vitrification and shrinkage thereof about said grains to form the final completed article.

2. A process of making abrasive material which comprises coating crystalline abrasive grains with a layer of naphthalene, applying a second coat to the grains of finely divided, colloidally ground, readily vitrifiable aluminous material, the particles of which have a size of 20 microns or less, molding said particles into a unified article, heating said article at low temperature to remove the naphthalene, and at high temperature to vitrify the aluminous material.

3. A process of making abrading material which comprises coating crystalline grains with a volatile substance to form a first layer, coating said coated grains with a second layer consisting of finely divided, colloidally ground, readily vitrifiable aluminous material, forming a plurality of said grains into an article, heating said article at low temperature to remove the volatile substance, and heating at a temperature below the melting point of the aluminous material to vitrify, shrink and solidify the material into the final abrading form.

4. A process of making an abrasive article which consists in coating hard crystalline grains with naphthalene, coating the naphthalene layer with a layer of bonded, colloidally ground, readily vitrifiable bauxite, molding the composite grains so formed into an article, heating the article at low temperature to remove the naphthalene, and at temperatures inferior to 1450° C. to vitrify, shrink and solidify the bauxite.

5. An abrasive material comprising composite silicon carbide grains united by means of a non-crystalline, amorphous, abrasive, aluminous bond, said composite grain comprising a plurality of crystalline grains united with a vitreous and dense substance, the average hardness of said composite grain being approximately 9 Mohs, and said bond consisting of a substance having a hardness materially less than 9 Mohs, said aluminous abrasive being selected from the group consisting of dehydrated, amorphous, wet ground bauxite and alumina having a particle size of about 12 to 20 microns and fired at 1200 to 1600° C.

6. The process of making abrasive material which comprises coating hard, crystalline, silicon carbide grains with a volatile substance to form a first layer, applying finely divided, colloidally ground, readily vitrifiable aluminous material to said grain to form a second layer over said first layer, molding a plurality of said grains into a unified mass, heating said mass at a low temperature to remove the volatile substance, and at a high temperature to vitrify and shrink the aluminous material, crushing and grading said vitrified mass into composite grains consisting of aluminous material with crystalline grains embedded therein, and finally bonding the composite particles together with a bond having a hardness less than that of the composite grains.

7. A process of forming an aluminous abrasive in which a vitrified, amorphous, aluminous material forms the continuous phase and crystalline grains of silicon carbide form the disperse phase, which comprises grinding a dehydrated aluminous material in the wet to an average micron size of less than 50 microns, dehydrating, grinding and drying such ground aluminous material, coating the silicon carbide grains with a non-drying oil to give an adhesive film to the surfaces thereof, coating the oiled grains with finely divided naphthalene, mixing the oiled and naphthalene coated grains with the finely ground aluminous material, compressing the mixture of the oiled and naphthalene coated grains and the finely ground aluminous material, baking the compressed material to volatilize the naphthalene and remove it at a temperature not substantially in excess of 75° C., vitrifying the materials by firing at temperatures from 1200° C. to 1600° C. to produce an abrasive article in which the silicon carbide grains are rigidly and firmly bonded in the aluminous mass and in which the vitrified aluminous continuous phase has a hardness approximating at least 9 Mohs.

8. An abrasive grain comprising a continuous phase of a vitrified, colloidally ground, dehydrated, amorphous bauxite combined with a disperse phase of abrasive silicon carbide grains, both the disperse phase and the continuous phase having an average hardness of about 9 Mohs, and the spacing between the grains varying from 0.001 inch to 0.010 inch.

9. As an article of manufacture an abrading wheel comprising a homogeneous mass of amorphous, non-crystalline, vitreous, dense, aluminous material having a hardness approximating 9 Mohs, and having pores throughout the mass constituting a primary abrasive forming a substantially continuous phase, and a plurality of hard, abrading grains interspersed throughout said mass whereby the grinding surface of said wheel consists of multiple crystalline grains spaced by bonding, abrading, aluminous material, said grains forming a substantially disperse phase, said aluminous material being selected from the group consisting of dehydrated, amorphous, wet ground bauxite and alumina having a particle size of about 12 to 20 microns and fired at 1200 to 1600° C.

10. An abrading material comprising an amorphous, non-crystalline, vitreous, aluminous abrasive forming a substantially continuous phase and abrasive grains of crystalline substance mixed with said abrasive forming a substantially disperse phase, the number of grains being sufficient to reduce the average thickness of the abrasive separating the grains to approximately 0.004 inch, said aluminous abrasive being selected from the group consisting of dehydrated, amorphous, wet ground bauxite and alumina having a particle size of about 12 to 20 microns and fired at 1200 to 1600° C.

11. An abrading material comprising an amorphous, non-crystalline, vitreous, aluminous abrasive forming a substantially continuous phase and abrasive grains of crystalline substance mixed with said abrasive forming a substantially disperse phase, the number of grains being sufficient to reduce the average thickness of the abrasive separating the grains to a value lying approximately between 0.002 inch and 0.006 inch, said aluminous abrasive being selected from the group consisting of dehydrated, amorphous, wet ground bauxite and alumina having a particle size of about 12 to 20 microns and fired at 1200 to 1600° C.

JOHN ALLEN HEANY.